United States Patent [19]

Hayashi et al.

[11] 4,044,626
[45] Aug. 30, 1977

[54] BALANCING RING OF CENTRIFUGAL EXTRACTOR

[75] Inventors: Gentaro Hayashi, Kanzaki; Kenji Yamamoto, Kusatsu; Yasakao Yamamoto, Yasu, all of Japan

[73] Assignee: Sanyo Electric Co., Ltd., Moriguchi, Japan

[21] Appl. No.: 676,820

[22] Filed: Apr. 14, 1976

[30] Foreign Application Priority Data

Apr. 18, 1975 Japan .................................. 50-48851
May 7, 1975 Japan .................................. 50-61404[U]

[51] Int. Cl.² ..................... F16F 15/22; D06F 37/24
[52] U.S. Cl. ................................ 74/573 F; 68/23.2; 68/23.3; 210/144
[58] Field of Search ............. 68/23.2, 23.3; 210/144, 210/363, 364; 233/1 C, 23 A; 74/573 F, 573 R; 301/5 B, 5 BA; 308/146, 147; 164/287

[56] References Cited

U.S. PATENT DOCUMENTS

| | | | |
|---|---|---|---|
| 2,375,635 | 5/1945 | Dyer | 74/573 F |
| 2,549,756 | 4/1951 | Clark | 68/23.2 X |
| 2,652,710 | 9/1953 | De Remer | 74/573 F X |
| 2,836,083 | 5/1958 | Smith | 68/23.2 X |
| 2,836,301 | 5/1958 | Bruckman | 68/23.2 X |
| 3,610,069 | 10/1971 | Tanner | 68/23.3 X |

*Primary Examiner*—Philip R. Coe
*Attorney, Agent, or Firm*—Darby & Darby

[57] ABSTRACT

This invention relates to a balancing ring for a centrifugal extractor for a washing machine which consists of a hollow ring which contains a balancing liquid. The hollow ring is attached to the side wall of a spin basket and is provided with a plurality of partition boards attached alternately to the upper and lower walls of the ring respectively.

7 Claims, 7 Drawing Figures

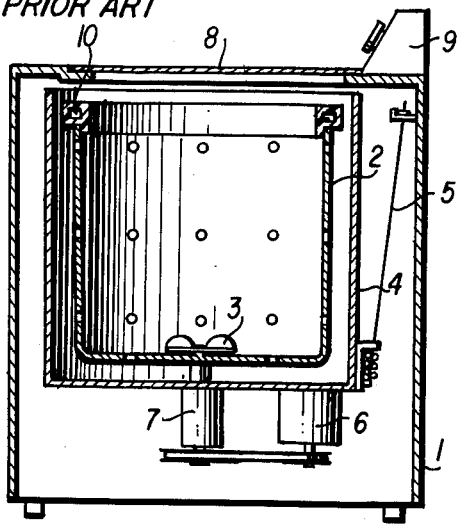
FIG. 1 PRIOR ART
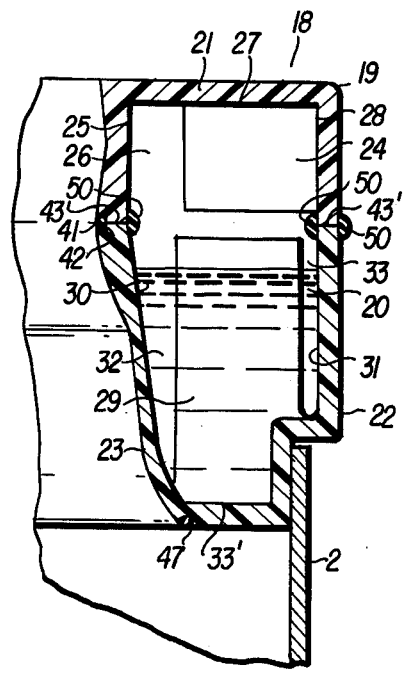
FIG. 2 PRIOR ART
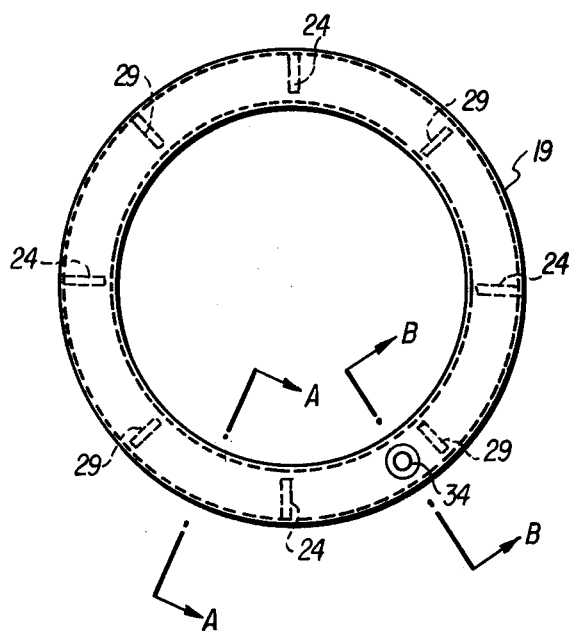
FIG. 3
FIG. 4

BALANCING RING OF CENTRIFUGAL EXTRACTOR

BACKGROUND OF THE INVENTION

In a conventional household washing machine which has a centrifugal extractor, a spin basket is made of metal and metal or concrete is used as a balancing weight. The weight of the structure becomes fairly high because it totals 13 kg from the 8 kg of the spin basket to which is added the 5 kg of the balancing weight. If a spin basket made of plastic is used, the weight of the structure becomes lighter because the spin basket weighs only 2 kg. However, deformation and vibration of a spin basket made of plastic tends to become large at the beginning of rotation and during synchronous rotation of the basket. It is impossible to make the weight of the entire structure small because it is necessary to increase the weight of the balancing weight to 11 kg in order to satisfy the balancing function due to the small weight of the plastic spin basket.

Therefore, it is considered to make a spin basket of plastic and use a balancing ring which consists of a hollow ring containing liquid as the balancing weight.

A conventional balancing ring is described as follows with reference to FIGS. 1 and 2.

Numeral 1 indicates a cabinet and 2 indicates a plastic spin basket which holds a washing basket which is suitably mounted in said cabinet 1. A rotary agitator 3 is provided at the bottom of said spin basket 2. A water tank 4 is supported by a plurality of supporting means 5. Numeral 6 indicates a driving motor for the spin basket 2 and rotary agitator 3 provided at the bottom of the water tank 4. A bearing 7 is provided for the spin basket 2 and the rotary agitator 3. Numeral 8 indicates an upper cover for the washing machine and 9 indicates a control box. A balancing ring 10 is attached to the side wall of the spin basket 2. As shown in FIG. 2, the balancing ring 10 consists of a hollow ring 11 which is provided with a plurality of projecting partition boards 16 mounted on the lower wall. The ring 10 is filled approximately one-half full of water 17.

The space 14 between a said partition board 16 and the inside wall 12 of the hollow ring 11 is made large in order that the water 17 may flow easily thereby supplementing the unbalance of the mass of clothes in the spin basket 2 at the beginning of rotation. The space 15 between a said partition board 16 and the outside wall 13 of said hollow ring 11 is made small in order to prevent the occurrence of abnormal vibration of the spin basket 2 by violent flowing of water which is moved to the vicinity of said outside wall 13 by the centrifugal force produced by the increase of rotational speed of the basket.

In this conventional balancing ring, however, if said partition board 16 is made large in order to suppress the flow of water, the balancing action of the water is delayed and abnormal vibration occurs because rapid flow of said water is prevented by the resistance of the large area of the partition board 16 at the beginning of rotation of the spin basket 2. Conversely, if the partition board 16 is made small, it is effective for the water to hold balance because the water can flow easily at the beginning of rotation. However, from the time of passing the critical speed after the start of rotation to the time of synchronous rotation, water moved to the vicinity of said outside wall 13 begins to flow violently above the partition board 16, and abnormal vibration of the basket occurs since it is out of balance. This describes the problem in the conventional balancing ring.

OBJECTS OF THE INVENTION

It is an object of this invention to provide a balancing ring for a centrifugal extractor which can balance rapidly at the beginning of centrifugal extraction and hold the balancing state at the times of passing the critical speed and during synchronous rotation.

Another object of this invention is to provide a balancing ring for a centrifugal extractor which is lighter than a conventional ring which includes concrete or metal.

A further object of this invention is to provide a balancing ring for a centrifugal extractor which extends from the interior of the wash basket to the exterior perfectly and is also easy to inspect for the leakage of air or water.

BRIEF DESCRIPTION OF THE DRAWINGS

FIG. 1 shows a cross-sectional view of a prior art washing machine which has a balancing ring for a centrifugal extractor.

FIG. 2 shows an enlarged cross-sectional view of the conventional balancing ring for a centrifugal extractor of FIG. 1.

FIG. 3 shows a top view of one embodiment of the balancing ring for a centrifugal extractor according to this invention.

FIG. 4 shows an enlarged cross-sectional view taken along line A—A in FIG. 3.

DETAILED DESCRIPTION OF PREFERRED EMBODIMENTS

This invention is described in detail hereinafter with reference to the drawings.

Figure 5:
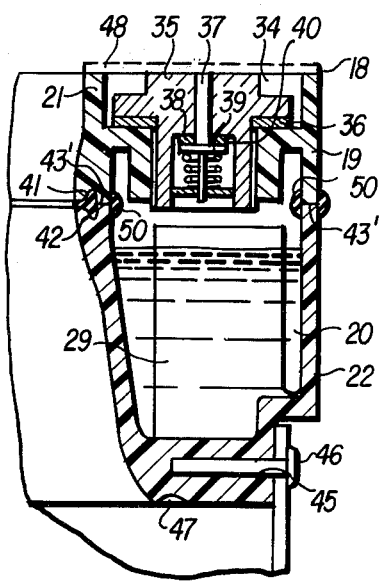
FIG. 5 shows an enlarged cross-sectional view taken along line B—B in FIG. 3.

In FIGS. 3, 4 and 5, numeral 18 indicates a balancing ring which comprises a hollow ring 19 preferably of plastic, containing water 20. Numerals 21, 22 indicate upper and lower drain ring sections made of plastic which are fastened together to the hollow ring 19. The height of the upper drain ring section 21 is smaller than that of the lower drain ring section 22 and the exterior surface of inside wall 23 of the lower drain ring section 22 is inclined so that the upper part of the wall 23 is nearer the center of the hollow ring 19. Numeral 24 indicates an upper partition board which is attached to and projects downwardly from the upper wall 27 and inwardly from the outside wall 28 of the upper drain ring section 21 with a space 26 between the inside wall 25 of the upper drain ring section 21 and itself. Numeral 29 indicates a lower partition board which is attached to and projects upwardly from the lower wall 33' of the lower drain ring section 22 with a space 32 between the inside wall 30 of the lower drain ring section 22 and itself and a space 33 between the outside wall 31 of lower drain ring 22 and itself. A plurality of said upper and lower partition boards 24, 29 are alternately provided on the upper and lower drain ring sections 21, 22 respectively, and the heights of both said upper and lower partition boards 24, 29 is less than that of the respective upper and lower drain ring sections 21, 22 to which they are attached.

The space 32 between the lower partition board 29 and the inside wall 30 of the lower drain ring section 22 is made large so that the water 20 may flow easily at the beginning of centrifugal extraction. The space 33 between the lower partition board 29 and outside wall 31 of the lower drain ring section 22 is made narrow so that water moved to the vicinity of the outside wall 31 by centrifugal force with the increase of rotational speed may not flow so freely.

Furthermore, numeral 34 indicates a pouring aperture through which liquid, i.e. water 20, is provided in the upper drain ring section 21 and 35 indicates a plug which closes the pouring aperture 34 by a packing 36. Numeral 37 indicates a pressure relief aperture which is provided through the plug 35. Numeral 38 indicates a valve which closes the pressure aperture 37. Numeral 39 indicates a spring which urges the valve 38 to close the pressure aperture 37. A pressure plate 40 which prevents the leakage of air or liquid from the pressure aperture 37 is part of the valve 38 and is moved by said spring 39.

Numerals 41, 42 indicate slots which are provided on the inner walls of the ends 43, 44 of the upper and lower drain ring sections 21, 22 respectively. Numerals 45, 46 indicate a screw hole and a screw respectively which are provided at the bottom of the lower drain ring section 22. Numeral 47 indicates a hole for locating a metal press during manufacture of the ring provided at the bottom surface of the lower drain ring section 22. Numeral 48 indicates a seal made of plastic, aluminum film and the like which covers the plug 35.

The manufacturing process for the balancing ring is described below.

Figure 6A:
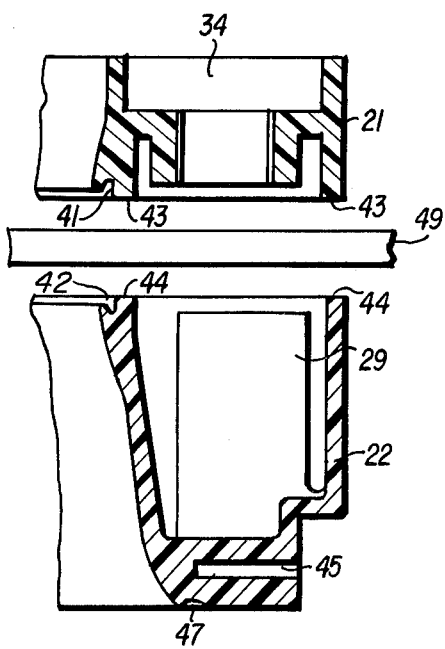
FIGS. 6 (a) and (b) show cross-sectional views of a manufacturing process for an embodiment of a balancing ring according to this invention.
Figure 6B:
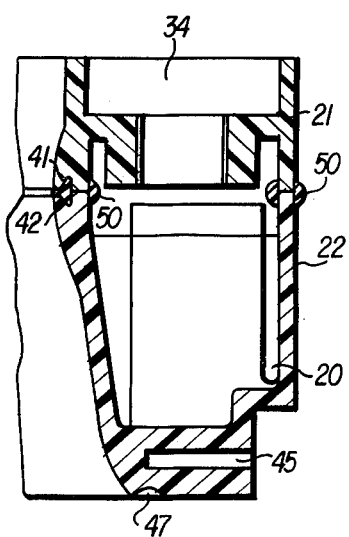

As shown in FIG. 6A, a thermal board 49 is inserted between the upper drain ring section 21 and the lower drain ring section 22 each of which is engaged by a metal heat press (not shown) by the locating hole 47 in the lower drain ring section 22. The open ends 43, 44 of the drain ring sections 21, 22 are pressed to the thermal board 49 and said board is melted. Thereafter, the thermal board 49 is removed, and the open tops 43, 44 are mutually attached and solidified by the thermal weld so that the hollow ring 19 is constructed by attaching both drain ring sections 21, 22 together at their open tops 43, 44.

In this case, the partition boards 24, 29 do not collide with the thermal board 49 during the welding operation because both partition boards 24, 29 do not extend to the respective tops 43, 44. Therefore, it is unnecessary to provide holes for the partition boards 24, 29 to extend through the thermal board 49. Therefore, the thermal distribution of the thermal board 49 is uniform as it is heated and high accuracy and intensity of welding is assured.

An area 50 of melted plastic is found on both tops 43, 44 of the drain ring sections 21, 22 on both the internal and external surfaces of outside wall 28, 31 and on the internal surface of said inside walls 25, 30. Melted plastic is not exposed on the external surface of said inside walls 25, 30, that is on the internal surface of the balancing ring 18, because the melted plastic 50 flows into both slots 41, 42 provided on the inside walls of the tops 43, 44. Therefore the external appearance is very good and it is possible to put clothes into and take those out of said spin basket 2 smoothly without snagging the clothes on a ragged edge.

Next, water 20, which includes salt for preventing the freezing of the water 20, is poured into the hollow ring 19 through the liquid pouring aperture 34 to approximately half fill the ring with liquid. The upper surface of the water is a little below the welded part 43'. Then the pouring aperture 34 is closed by the plug 35 and the packing 36. The seal 48 is further welded to the plug 35 so that water does not disperse even if it leaks out from the plug 35 because of damage to said packing 36. Seal 48 also prevents taking out said plug 35 due to error.

In addition, it is also possible to pour the water 20 into said lower drain ring 22 before both drain ring sections 21, 22 are fastened together by the thermal welding.

The method for inspection of leakage of air or water from said welded part 43' is described as follows.

The hollow ring 19 costructed as described above is subjected to increasing pressure by applying pressurized air from a hose (not shown) through the aperture 37 of said pressure holding apparatus 40 consisting of said valve 38 and said spring 39. When said hollow ring 19 is turned over, said welded part 43' lies below the water surface. Therefore, it is possible to inspect the quality of the welding by observing the leakage of internal water from the welded part 43' in this state. If the whole or one part of hollow ring 19 is transparent, it is also possible to observe the invasion of air into the water inside of said hollow ring 19 by turning over the hollow ring 19 and decreasing the pressure by removing air through said pressure aperture 37.

Furthermore, it is possible to observe the leakage of air from said welded part 43' of said hollow ring 19 by immersing it in water, with the inside of the ring containing no water but containing air under pressure, or to observe the invasion of water into the hollow ring 19 which is immersed in water, with the ring being in a state of reduced pressure and containing no water. It is also possible to inspect the leakage of air by a measuring instrument in a state of increasing pressure without the hollow ring 19 being immersed in the water.

It is possible to confirm the quality of the welding of the welded part 43' by adopting one of the inspection methods for the leakage of air or water described above.

Next, the behavior of the balancing ring of the centrifugal extractor is described.

The spin basket 2 starts to rotate when the switch is turned on after clothes are put into the spin basket 2. If clothes in the spin basket 2 are distributed irregularly, the water 20 in the balancing ring 18 flows in the ring 18 so that the irregularity of distribution of the mass of the clothes may be corrected and the vibration of the spin basket 2 may be prevented. That is, in this case, the water which is positioned at the bottom of the hollow ring 19 flows mainly through the spaces 26, 32 between the partition boards 24, 29 and the inside walls 25, 30 of both drain ring sections 21, 22 respectively and the space between the alternately spaced upper partition boards 24 and the lower partition boards 29 on the upper and lower drain ring sections 21, 22 respectively. This balances the irregularity of mass of said clothes. The water 20 is moved to the vicinity of the outside walls 28, 31 of said hollow ring 19 by centrifugal force with the rise of rotational speed of the spin basket 2. From the time of passing the critical speed to that of synchronous rotation, the flow of the water moved outwardly is interrupted by the upper partition board 24 directly attached to the outside wall 28 of the drain ring section 21 and restricted in flow by the lower partition board 29 because the space 33 between the lower partition board 29 and the outside wall 31 is narrow. Therefore, the tendency to become out of balance is reduced because the water does not flow so violently and the water is in parts of the ring between the partitions does not collide.

In a centrifugal extractor which utilizes the balancing ring 18 of this invention, the spin basket 2 is made of plastic and weighs 2 kg, the hollow ring 19 made of plastic and weighs 1 kg, the liquid used as the balancing weight weighs 1 kg, the weight of the whole is 4 kg. It is quite lower in weight than a conventional prior art ring which uses a balancing weight made of metal or concrete. It also improves the performance of balancing because the spin basket 2 made of plastic with the balancing ring 18 only vibrates slightly at the beginning of rotation of the spin basket 2.

As described above, the balancing ring of this invention has a variety of features as the following:

It starts the balancing action rapidly at the beginning of centrifugal extraction, and holds the balancing state at the time of passing the critical speed until synchronous rotation is reached. Therefore, the performance of balancing is greatly improved.

It is possible to make the mass of the entire centrifugal extractor small by making both spin basket and balancing ring of plastic and using liquid as the balancing weight.

It is possible to make the inside and outside relatively smooth and to manufacture the balancing ring easily by constructing the hollow ring by thermal welding as compared to a conventional one in which screws or adhesive are used.

It is possible to attach the balancing ring securely to the side wall of the spin basket due to the resiliency of the plastic material without any gap between the balancing ring and the side wall of the spin basket.

It is, furthermore, possible to inspect easily the leakage of air or water.

What is claimed is:

1. The combination comprising a spin basket for a cetrifugal type washing machine, said basket having a bottom and a side wall, a hollow balancing ring adapted for containing a liquid attached to said basket side wall, said balancing ring having top bottom and side walls, and a plurality of partition members projecting from said ring top and bottom walls extending only partially into the interior of the ring adapted to modify the flow of liquid in the ring.

2. The combination of claim 1 wherein said partition members alternately project from said bottom and top wall of said balancing ring.

3. The combination of claim 1 wherein the partition members projecting from the top wall of the balancing ring also extend to the outside wall of the balancing ring.

4. The combination of claim 1 wherein the partition members projecting from the bottom wall are spaced from both side walls of the balancing ring.

5. The combination of claim 1 wherein said balancing ring is formed of upper and lower sections of plastic material which are welded together.

6. The combination of claim 1 further comprising a liquid pouring aperture formed in said balancing ring, and a plug sealing said aperture.

7. The combination of claim 6 further comprising pressure relief means on said plug.

* * * * *